US005912093A

United States Patent [19]
Wen et al.

[11] Patent Number: 5,912,093
[45] Date of Patent: Jun. 15, 1999

[54] POLYURETHANE-BASED POLYMERIC ELECTROLYTE AND PROCESS FOR PRODUCING SAME

[75] Inventors: Ten-Chin Wen, Tainan; Tsung-Tien Cheng, Kaohsiung, both of Taiwan

[73] Assignee: National Science Council, Taiwan

[21] Appl. No.: 08/856,725

[22] Filed: May 15, 1997

[51] Int. Cl.$^6$ ............... H01M 6/14; C08F 8/42; C08K 3/10
[52] U.S. Cl. ............ 429/192; 429/190; 429/195; 528/488; 528/490; 528/71; 524/401
[58] Field of Search ............ 524/401; 528/488, 528/490, 71; 429/190, 192

[56] References Cited

U.S. PATENT DOCUMENTS

| | | | |
|---|---|---|---|
| 4,237,264 | 12/1980 | Noll et al. | 528/71 |
| 4,801,644 | 1/1989 | Coogan | 524/839 |
| 4,855,077 | 8/1989 | Shikinami et al. | 524/401 |
| 5,407,593 | 4/1995 | Whang | 429/192 |
| 5,456,000 | 10/1995 | Gozdz et al. | 429/192 |
| 5,549,987 | 8/1996 | Venugopal et al. | 429/192 |
| 5,687,056 | 11/1997 | Harshe et al. | 361/328 |

OTHER PUBLICATIONS

F. Croce, et al.; "Synthesis and Characterization of Highly Conducting Gel Electrolytes"; *Electrochimica Acta*, vol. 39, No. 14, pp. 2187–2194, 1994.

Hong, et al.; "Studies on PAN–based Lithium Salt Complex", *Electrochimica Acta*, vol. 37, No. 9, pp. 1671–1673, 1992.

R.A. Reed, et al.; "Solid State Voltammetry in Ionically Conducting Phosphazene–LiSO$_3$CF$_3$ Film"; *J. Electrochem.Soc.*, vol. 136, No. 9, pp. 2565–2570, Sep. 1989.

K.M. Abraham, et al.; "Dimensionally Stable MEEP–based Polymer Electrolytes and Solid–State Lithium Batteries"; *Chem. Mater.*, vol. 3, pp. 339–348; 1991.

*Primary Examiner*—Tae Yoon
*Attorney, Agent, or Firm*—Knobbe, Martens, Olson & Bear, LLP

[57] ABSTRACT

The present invention is related to a process for producing a polyurethane-based polymeric electrolyte including steps of: a) providing a polyurethane material as a matrix material; b) dispersing the matrix material in a first solvent to form a dispersion solution; c) drying the dispersion solution to form a thin film of polyurethane as a matrix of the polymeric electrolyte; and d) adding a component of an organic electrolyte into the matrix to form the polyurethane-based polymeric electrolyte. The present invention is also related to a polyurethane-based polymeric electrolyte including a thin film of a polyurethane serving as a matrix of the polymeric electrolyte; and an organic electrolyte arranged in the matrix for ionic conduction. The fabricated thin film electrolyte has satisfactory conductivity and can be suitably used in cells.

23 Claims, No Drawings

POLYURETHANE-BASED POLYMERIC ELECTROLYTE AND PROCESS FOR PRODUCING SAME

FIELD OF THE INVENTION

The present invention is related to a polymeric electrolyte, and more particularly, to a waterborne polyurethane-based polymeric electrolyte. Also, the present invention is related to a process for producing a polyurethane-based polymeric electrolyte.

BACKGROUND OF THE INVENTION

A polymeric solid electrolyte is a kind of polymeric thin film performing ion conduction rather than electron conduction. The polymeric solid electrolyte is adapted to be used in a series of primary and secondary lithium cells or lithium-ion cells to thin the cells in shape. The thinned cells also can be further processed into windable cells, bipolar stack cells, thin-film cells, etc., according to various requirements. In addition, the use of polymeric solid electrolytes in the cells can overcome the problems of difficult package and current leakage encountered by general cells with liquid electrolyte.

In earlier stage, the research on polymeric solid electrolytes is focused on the polyethylene oxide-based material. The material has a relatively low conductivity, as low as $10^{-7} \sim 10^{-8}$ S/cm, at room temperature so that the material works only at high temperature such as 80° C. or above. Furthermore, a lot of organic solvent which is detrimental to the industrial security and the environmental protection is used and then evaporated in the process for producing the polyethylene oxide-based thin film.

In recent years, gel electrolytes have been reported to be used in cells, and the product has a practically desired level of conductivity at room temperature. Nevertheless, the film has to be produced in a glove box or dry room so that the manufacturing process will be built with high cost.

SUMMARY OF THE INVENTION

Therefore, an objective of the present invention is to provide a process for producing a polyurethane (PU)-based polymeric electrolyte, which can be carried out in the presence of a extremely small amount of organic solvent so that the problem in industrial security and environmental protection during the process can be solved.

A further objective of the present invention is to provide a process for producing a polyurethane-based polymeric electrolyte, which can be carried out in air substantially, thereby facilitating the mass production of the electrolytes and reducing the manufacturing cost.

Another object of the present invention is to provide a polyurethane-based polymeric electrolyte which has satisfactory conductivity, i.e. about $10^{-3}$ S/cm.

A further object of the present invention is to provide a polyurethane-based polymeric electrolyte which can be used in cells, thereby thinning the cells in shape and allowing the cells to be further processed as desired.

In accordance with the present invention, a process for producing a polyurethane-based polymeric electrolyte includes steps of: a) providing a polyurethane material as a matrix material; b) dispersing the matrix material in a first solvent to form a dispersion solution; c) drying the dispersion solution to form a thin film of polyurethane as a matrix of the polymeric electrolyte; and d) adding a component of an organic electrolyte into the matrix to form the polyurethane-based polymeric electrolyte.

Preferably, the step a) includes substeps of: a1) polymerizing a dried hydroxyl group-containing component and an isocyano group-containing component to form a prepolymer of polyurethane; and a2) adding to the prepolymer a diamino-chain extender in the presence of a second solvent to form the matrix material. In the above steps, the isocyano group (NCO)-containing component is a compound including two or more isocyano groups therein or a mixture of compounds including various numbers of isocyano groups therein. For example, the isocyano group-containing component can be one selected from a group consisted of toluene diisocyanate (TDI), methylene diphenylene diisocyanate (MDI), isophorone diisocyanate (IPDI), and a mixture thereof. On the other hand, the hydroxyl group (OH)-containing component is a compound including two or more hydroxyl groups therein or a mixture of compounds including various numbers of hydroxyl groups therein. For example, the hydroxyl group-containing component can be one selected from a group consisted of polyethylene glycol (PEG), polypropylene glycol (PPG), polytetramethylene glycol (PTMG), and a mixture thereof.

Preferably, the polymerization reaction of step a1) is carried out at a temperature ranged from 60 to 100° C., and a functionality ratio of isocyano groups to hydroxyl groups (NCO/OH) lies between 1.0 and 2.0.

In a preferred embodiment, the second solvent used in the step a2) is acetone, and the diamino-group extender used in the step a2) is lithium diaminosulfonate.

Preferably, the first solvent used in the step b) is water. In this case, an ionic group such as a carboxyl group and/or a sulfonic group is preferably provided to the prepolymer in the step a1) for enhancing the hydrophilicity of the resulting matrix material. The attachment of the ionic group to the prepolymer can be made by adding a compound containing the ionic group, e.g. dimethanol propionic acid (DMPA), to the reaction system during the polymerization step, or previously providing the ionic group to the hydroxyl group-containing component and/or the isocyano group-containing component prior to the polymerization step.

Preferably, the step b) of the present process includes substeps of: b1) dropping water to the matrix material formed in step a); and b2) removing the second solvent used in step a2).

Preferably, the step c) is carried out by blowing the dispersion solution in air or warming the dispersion solution in an oven.

Preferably, the step d) is carried out by immersing the matrix into a dried organic electrolytic solution containing a salt electrolyte and a third solvent to swell the matrix, wherein the salt electrolyte is a lithium salt selected from a group consisted of $LiCF_3SO_3$, $LiClO_4$, $LiPF_6$, $LiBF_4$, $LiAsF_6$, $LiN(CF_3SO_2)_3$, and a mixture thereof, and the third solvent is one selected from a group consisted of propylene carbonate (PC), ethylene carbonate (EC), diethyl carbonate (DEC), dimethyl carbonate (DMC), diethyl ether (DEE), γ-butyrolactone (γ-BL), 2-methyl-tetrahydrofuran (2-Me-THF), 1,2-dimethoxyethane (DME), tetrahydrofuran (THF), N-methyl-2-pyrrolidone (NMP), dioxolane, and a mixture thereof.

In accordance with another aspect of the present invention, a polyurethane-based polymeric electrolyte includes a thin film of a polyurethane serving as a matrix of the polymeric electrolyte; and an organic electrolyte arranged in the matrix for ion conduction, wherein the organic electrolyte includes a lithium salt selected from a group consisted of $LiCF_3SO_3$, $LiClO_4$, $LiPF_6$, $LiBF_4$, LiAsF$_6$, LiN(CF$_3$SO$_2$)$_3$, and a mixture thereof, and a solvent selected from a group consisted of propylene carbonate, ethylene carbonate, diethyl carbonate, dimethyl carbonate, diethyl ether, γ-butyrolactone, 2-methyl-tetrahydrofuran, 1,2-dimethoxyethane, tetrahydrofuran, N-methyl-2-pyrrolidone, dioxolane, and a mixture thereof.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

As disclosed above, the present polyurethane-based polymeric electrolyte includes a thin film of polyurethane and an organic electrolyte. Now, a process for producing this polymeric electrolyte will be described more clearly as follows by using a diidocyanate compound as the isocyano group-containing component, a polydiol as the hydroxyl group-containing component, dimethanol propionic acid as the ion-group donor, lithium diaminosulfonate as the diamino-chain extender, and proper solvents. The process includes steps of:

a) drying the polydiol compound in a vacuum oven;

b) polymerizing the dried polydiol compound and the diisocyanate compound with a functionality ratio of 1.0<NCO/OH<2.0 at a temperature ranged within 60–100° C. in the optional presence of an adequate amount of dimethanol propionic acid to form a PU prepolymer;

c) adding acetone and lithium diaminosulfonate to the prepolymer to accomplish the polymerization;

d) forming a dispersion solution of the resulting product in step c) by dropping thereto substantially pure water;

e) recovering acetone from the dispersion solution under reduced pressure and heat to form a waterborne PU aqueous solution, wherein the solid content in the solution can be adjusted according to the desired operational viscosity;

f) drying an adequate amount of the waterborne PU aqueous solution by blowing the solution in air or warming it in an oven to form a PU thin film;

g) immersing the PU thin film in a water-free organic electrolytic solution, preferrably in a drying; box, to swell the film, thereby obtaining the present polymeric electrolyte including a thin film of polyurethane and an organic electrolyte.

The diisocyanate compound includes; a variety of compounds having two —NCO functional groups in its molecule, for example TDI, MDI, IPDI, etc. On the other hand, the polydiol compound includes a variety of compounds having two —OH functional groups in its molecule, for example PEG, PPG, PTMG etc. It should be understood that compounds having more than two —NCO functional groups or —OH functional groups can also be used in lieu of the diisocyanate compound and the polydiol compound, respectively. Alternatively, a mixture of compounds having various numbers of isocyano groups or a mixture of compounds having various numbers of hydroxyl groups can be used. The toughness and the water-absorption capacity of the PU thin film can be adjusted by varying the components included in the hydroxyl group-containing mixture and the corresponding proportions thereof.

The above-mentioned dimethanol propionic acid used in the polymerization step can enhance the hrdrophilicity of the resulting prepolymer to facilitate the conversion of the prepolymer into waterborne material and further make the water-absorption capacity of the PU thin film enhanced. In addition, dimethanol propionic acid can also facilitate the promotion of the conductive performance of the finial electrolyte since the neutralization between dimethanol propionic acid and lithium hydroxide makes the electrolyte bear lithium ions. Of course, the above effects can also be achieved by another way instead of adding the acid to the reaction system during polymerization, for example providing the ionic group to the hydroxyl group-containing component (the polydiol compound) and/or the isocyano group-containing component (the diisocyanate compound) prior to the polymerization step.

The above-mentioned organic electrolytic solution can be any kind of lithium salt in an adequate solvent used in conventional lithium cells. For example, they can be LiCF$_3$SO$_3$, LiClO$_4$, LiPF$_6$, LiBF$_4$, LiAsF$_6$, LiN(CF$_3$SO$_2$)$_3$ or a mixture thereof in a solvent of PC, EC, DEC, DMC, DEE, γ-BL, 2-Me-THF, DME, THF, NMP, dioxolane or a mixture thereof.

The process for preparing the PU thin film according to the present invention has advantages of being able to be carried out in air, no difficulty in the treatment of organic solvent, and minimizing the requirement for operation in an oven or a glove box. The final product, the polymeric electrolyte, can be applied to a series of lithium cells at various temperatures, e.g. from 5° C. to 90° C., depending on the formulation of the polymeric matrix. Moreover, the present electrolyte is also suitable for an electrochromic device owing to the excellent transparency thereof. Examples are now given to illustrate the present invention in detail. It should be noted that the examples are only given for illustrative purposes rather than limiting the scope of the present invention.

EXAMPLE 1

87.5 g of PEG, 32 g of IPDI and 1.2 g of DMPA are mixed and reacted in a reactor under nitrogen atmosphere with stirring to form a prepolymer. Add acetone and lithium diaminosulfonate to the prepolymer, then drop pure water to the system, and then recover acetone under reduced pressure and heat to form a waterborne PU dispersion solution.

EXAMPLE 2

Dry the dispersion solution obtained in Example 1 to form a PU thin film. Swell the PU thin film with a solution of 1M LiCF$_3$SO$_3$/PC in a glove box to obtain a PU-based polymeric electrolyte.

EXAMPLE 3

Dry the dispersion solution obtained in Example 1 to form a PU thin film. Swell the PU thin film with a solution of 1M LiClO$_4$/PC in a glove box to obtain a PU-based polymeric electrolyte.

EXAMPLE 4

Dry the dispersion solution obtained in Example 1 to form a PU thin film. Swell the PU thin film with a solution of 1M LiPF$_6$/PC/DEC in a glove box to obtain a PU-based polymeric electrolyte.

Compared to the conventional organic electrolytic solution, the present polymeric electrolyte is suitable for manufacturing a thin film cell, a bipolar stack cell or secondary lithium cell. Compared to the solid electrolyte having no solvent therein, such as polyethylene oxide (PEO) or poly(methoxyethoxy ethoxyphosphazene) (MEEP)-based electrolyte, the present polymeric electrolyte has high conductivity (about $10^{-3}$ S/cm) and proper mechanical toughness. In addition, during the PU dispersion solution is dried to form the PU thin film, no industrial security and environmental protection problems resulting from the evaporation of organic solvent are caused because water is the major solvent in the dispersion solution. Further, the present electrolyte performs well at various temperature. Compared to the conventional gel electrolyte such as polyacrylonitrile (PAN)-based electrolyte, the present process is easy and suitable for mass production.

To sum up, the present polymeric electrolyte is obtained by arranging an organic electrolyte in a PU thin film. The present electrolyte can be applied to a series of lithium cells and electrochromic devices for providing high conductivity at room temperature. On the other hand, the present process for producing a waterborne PU-based polymeric electrolyte complies with the requirements for mass production, industrial security and environmental protection.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for producing a polyurethane-based polymeric electrolyte for use in a lithium cell, comprising steps of:
    a) polymerizing a dried hydroxyl group-containing and an isocyano group-containing component to form a prepolymer of polyurethane, adding lithium diaminosulfonate as a diamino-chain extender to said prepolymer to form a polyurethane material provided as a matrix material;
    b) dispersing said matrix material in water to form a dispersion solution;
    c) drying said dispersion solution to form a thin film of polyurethane as a matrix of said polymeric electrolyte; and
    d) adding a component of an organic electrolyte into said matrix to form a waterborne polyurethane-based polymeric electrolyte.

2. The process according to claim 1 wherein in said step a), said lithium diaminosulfonate is added to said prepolymer.

3. The process according to claim 2 wherein said isocyano group-containing component is a compound including two or more isocyano groups therein.

4. The process according to claim 2 wherein said isocyano group-containing component is a mixture of compounds including various numbers of isocyano groups therein.

5. The process according to claim 2 wherein said isocyano group-containing component is one selected from a group consisted of toluene diisocyanate, methylene diphenylene diisocyanate, isophorone diisocyanate, and a mixture thereof.

6. The process according to claim 2 wherein said hydroxyl group-containing component is a component including two or more hydroxyl groups.

7. The process according to claim 2 wherein said hydroxyl group-containing component is a mixture of compounds including various numbers of hydroxyl groups therein.

8. The process according to claim 2 wherein said hydroxyl group-containing component is one selected from a group consisted of polyethylene glycol, polypropylene glycol, polytetramethylene glycol, and a mixture thereof.

9. The process according to claim 2, wherein in said step a), the polymerization of said hydroxyl group-containing component and said isocyano group-containing component is carried out at a temperature ranged from 60 to 100° C.

10. The process according to claim 2 wherein a functionality ratio of isocyano groups to hydroxyl groups lies between 1.0 and 2.0.

11. The process according to claim 2 wherein said second solvent is acetone.

12. The process according to claim 2 wherein an ionic group is provided to said prepolymer in said step a for enhancing the hydrophilicity of the resulting matrix material.

13. The process according to claim 12 wherein said ionic group is a carboxyl group.

14. The process according to claim 12 wherein said ionic group is a sulfonic group.

15. The process according to claim 12 wherein in said step a, a compound containing said ionic group is added to the reaction system during said polymerization step to provide said ionic group to said prepolymer.

16. The process according to claim 15 wherein said compound containing said ionic group is dimethanol propionic acid.

17. The process according to claim 12 wherein in said step a, said ionic group is provided to said hydroxyl group-containing component and/or said isocyano group-containing component prior to said polymerization step so as to form said prepolymer carrying said ionic group after polymerization.

18. The process according to claim 12 wherein said step b) includes substeps of:
    b1) dropping water to said matrix material formed in step a) to form said dispersion solution; and
    b2) removing said second solvent in said dispersion solution.

19. The process according to claim 1, wherein said step c) is carried out by blowing said dispersion solution in air.

20. The process according to claim 1, wherein said step c) is carried out by warming said dispersion solution in an oven.

21. The process according to claim 1 wherein said step d) is carried out by immersing said matrix into a dried organic electrolytic solution containing a salt electrolyte and a third solvent to swell said matrix.

22. The process according to claim 21 wherein said salt electrolyte is a lithium salt selected from a group consisted of $LiCF_3SO_3$, $LiClO_4$, $LiPF_6$, $LiBF_4$, $LiAsF_6$, $LiN(CF_3SO_2)_3$, and a mixture thereof.

23. The process according to claim 22 wherein said third solvent is one selected from a group consisted of propylene carbonate, ethylene carbonate, diethyl carbonate, dimethyl carbonate, diethyl ether, γ-butyrolactone, 2-methyltetrahydrofuran, 1,2-dimethoxyethane, tetrahydrofuran, N-methyl-2-pyrrolidone, dioxolane, and a mixture thereof.

* * * * *